July 26, 1966  D. McNICOLL  3,262,743
SEALING DEVICE FOR A ROLLER BEARING
Filed April 10, 1964  2 Sheets-Sheet 1

INVENTOR:
DAVID McNICOLL
BY Gravely, Lieder & Woodruff
ATTORNEYS.

July 26, 1966  D. McNICOLL  3,262,743
SEALING DEVICE FOR A ROLLER BEARING
Filed April 10, 1964  2 Sheets-Sheet 2

INVENTOR:
DAVID McNICOLL
BY Gravely, Lee & Woodruff
ATTORNEYS

United States Patent Office 3,262,743
Patented July 26, 1966

3,262,743
SEALING DEVICE FOR A ROLLER BEARING
David McNicoll, Solihull, England, assignor to The Timken Roller Bearing Company, Canton, Ohio, a corporation of Ohio
Filed Apr. 10, 1964, Ser. No. 359,820
Claims priority, application Great Britain, Dec. 24, 1963, 50,903/63
7 Claims. (Cl. 308—187.1)

The present application is a continuation-in-part of United States application, Serial No. 241,901, filed December 3, 1962, and now abandoned.

The invention relates to roller bearings with sealing devices heretofore disclosed and claimed in prior United States application Serial No. 241,901, filed December 3, 1962 with claim for priority on application No. 43,-539/61, filed December 5, 1961, in Great Britain, and heretofore disclosed and claimed in application No. 50,903/63, filed December 24, 1963 in Great Britain for patent of addition to application No. 43,539/61. The present application relates to the improvements in sealing devices for roller bearings heretofore disclosed and claimed in those prior applications. The invention is applicable to anti-friction bearings of the kind comprising an outer ring having an internal raceway, an inner ring having an external raceway with a rib or land at each end, and rolling elements of suitable contour spaced around the inner ring and radially located between the two raceways.

It is an object of the present invention to provide a sealing device of simple and inexpensive construction which can readily be fitted to a rolling bearings without involving any alteration in the standard design of the bearing.

According to the present invention there is provided a rolling bearing which is provided with a closure member comprising an inner flange arranged around a rib or land at one end of the bearing inner ring to rotate therewith, a body portion extending radially outwardly from said flange, and an outer flange which has a radially inwardly extending portion and which extends from said body portion towards the rolling elements so that the rim of the outer flange is disposed in a close clearance relationship axially with the rolling elements and radially with the raceway of the outer ring. Such a closure member may be provided at one end or at both ends of the rolling bearing, and one or both closure members may be associated with an annular flinger.

According to the present invention, it is also provided that the body portion of the closure member at its radially outer end is folded back upon itself to form an annular flange-like bead from the root of which the outer flange extends towards the roller element.

According to a feature of the invention, the improved bearing includes an annular resilient pad arranged around the outer flange and located by the bead with parts thereof in compressible engagement with the end face of the bearing outer ring and the bore of the housing of the bearing.

The resilient pad may be of rectangular section and arranged on the outer flange of the closure member in such manner that one edge engages the end face of the outer bearing ring and another edge engages the bore of the housing. If desired, the inner end face of the pad may be undercut to provide a more resilient nose or projection for engagement with the end face of the bearing ring. Alternatively the pad may be of channel shape and arranged with the outer edges of the channel sides in engagement with the bearing ring end face and the bore respectively.

It is preferred that the resilient pad is bonded or otherwise secured to the outer flange of the closure member so as to rotate therewith. The pad may be impregnated or covered with a suitable lubricant or may consist of a ring or grease or other lubricant of such consistency that it maintains the required shape.

The present invention also provides an end closure member for use with a bearing as defined above.

A supplementary seal in the form of a ring-like resilient pad may be arranged around the outer flange of the closure member to contact the adjacent end of the bearing outer ring. Where a flinger is provided, a resilient sealing ring may be disposed in the space between the flinger and the said outer flange; alternatively, a grease filling may be provided in that space.

In order that the invention may be clearly understood some forms thereof will now be described with reference to the accompanying drawing, in which.

Figure 1:
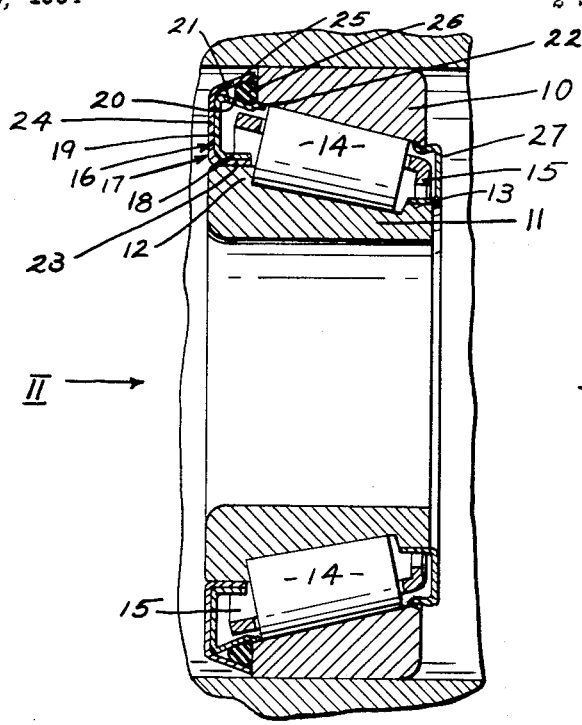
FIG. 1 is a sectional elevation showing one form of rolling bearing with sealing device.
Figure 2:
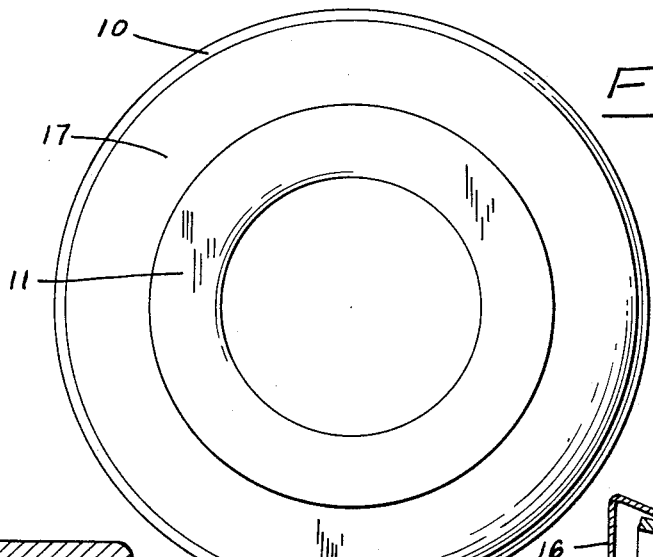
FIG. 2 is a view in the direction of the arrow II in FIG. 1.

Referring to the FIGURES 1 and 2 of the drawings, the bearing comprises an outer ring 10 having a conical raceway, an inner ring 11 having a conical raceway bounded at its larger end by a thrust rib 12 and at its smaller end by a lesser retaining rib 13. Tapered rollers 14 separated by a cage 15 are spaced around the inner ring between the ribs and are radially located between the inner and outer raceways. The remaining space between the inner and outer rings is intended to contain lubricant and the space is closed at the larger end of the bearing inner ring by an end closure member 16. The member 16 is arranged around the thrust rib 12 and is mounted on a flinger 17 which is in turn mounted as an interference fit on the thrust rib periphery.

The end closure member 16 is of a generally U-shaped section and comprises an inner flange 18, a flat body portion 19 which extends outwardly, and an outer flange 20. The outer flange has a portion 21 which is radially inwardly inclined from the flange root and extends axially towards the rollers 14. The rim 22 of flange 20 is disposed in close clearance relationship axially with the ends of the rollers and radially with the raceway of the outer ring 10. The rim 22 is curved outwardly and at its edge is formed to follow the contour of the bearing outer raceway. The flange rim is so disposed that it makes the smallest running clearance with the adjacent ends of the rollers 14 and with the raceway of ring 10. This result may be achieved by working the rim into the required form and situation by a tool fashioned like an outer race and located by the rollers 14 after the member 16 with the flange has been press-fitted onto the periphery of rib 12.

Figure 3:
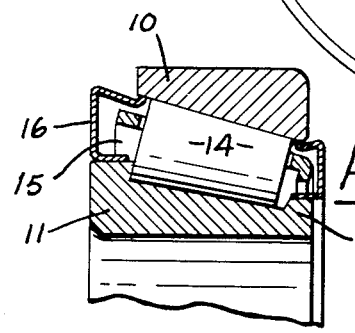
FIG. 3 is a detail section showing an alternative form of bearing with sealing device.
Figure 4:
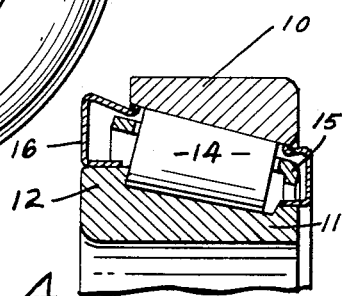
FIG. 4 is a detail section of a further alternative form of bearing with sealing device.

The rim of flange 20 may alternatively be flared outwardly as shown in FIGURE 3, folded back on itself as in FIGURE 4, or otherwise suitably beaded to the required form.

The flinger 17 (FIGURE 1) comprises an axially extending inner flange 23 and a radially extending body 24 having a flared end portion 25 which extends towards the end face and outer periphery of ring 10. The flange 23 and the body 24 of the flinger correspond in shape to the member 16 and receive it in close engagement so that the two parts may be fitted as a unit upon the rib 12 and will rotate therewith. The end portion 25 of the flinger is flared from the point where it projects beyond the flange 20, and the edge of the flared portion is in clearance relationship with the end face and outer periphery of ring 10. An annular space of triangular section is bounded by the portion 25, the flange 20 and the end face of ring 10. A ring-like pad 26 of a resilient material may be fitted in this annular space or alternatively the space may be filled with grease. The ring-like pad is elastically or compressibly engaged by flange 20, the end face of ring 10, and the inner surface of the flared end portion 25.

The lubricant space is closed at the small end of ring 11 by a closure member 27 which is similar to member 16. Member 27 is mounted as an interference fit on the periphery of rib 13.

Axial separation of the outer and inner bearing rings is restricted when a flinger or ring-like pad or both in combination are fitted at the small end of the rolling bearing thus permitting the assembly to be handled as a self-contained unit.

In an alternative embodiment, the flinger 17 and the closure member 16 may be formed in one piece.

Figure 5:
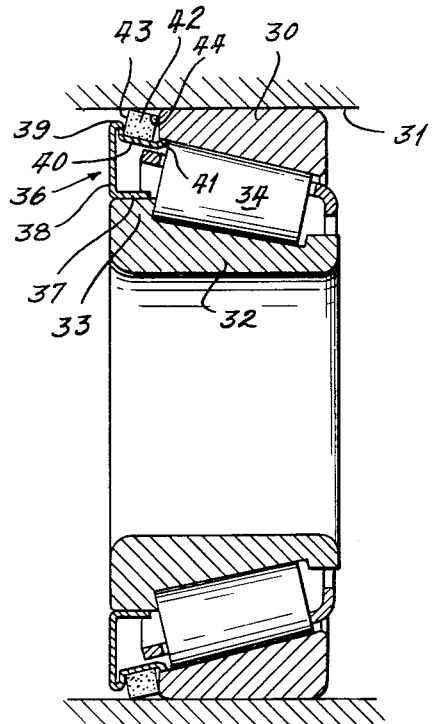
FIG. 5 is a sectional elevational view of a roller bearing according to the invention.

Referring now to FIG. 5, the bearing there shown comprises an outer ring 30 having a conical raceway and mounted in a housing 31, an inner ring 32 having a conical raceway bounded at its larger end by a thrust rib 33, and tapered rollers 34 spaced by a cage 35 in radial location between the inner end outer raceways. An end closure member 36 of a generally U-shaped section is arranged around the thrust rib 33 to rotate therewith. This closure member comprises an inner flange 37 mounted as an interference fit on the thrust rib periphery, a flat body portion 38 which extends radially outwards and which is folded upon itself so as to return radially inwards to form an annular flange-like bead 39, and an outer flange 40 which is inclined radially inwards from the root of the bead and extends axially towards the rollers 34. The rim 41 of the outer flange may be curved outwardly and at its edge formed to follow the contour of the raceway of the outer ring 30. The flange rim 41 is also so disposed that it makes the smallest running clearance with the adjacent ends of the rollers and with the raceway.

As shown in FIG. 5, a ring or pad 42 of resilient material and of rectangular cross section is accommodated around the inclined outer flange 40 adjacent to the bead 39 with its outer periphery substantially parallel thereto, the uppermost edge 43 comprising engaging the bore of the bearing housing 31 and the innermost edge 44 compressibly engaging the end face of the outer ring 30.

Figures 6, 7:
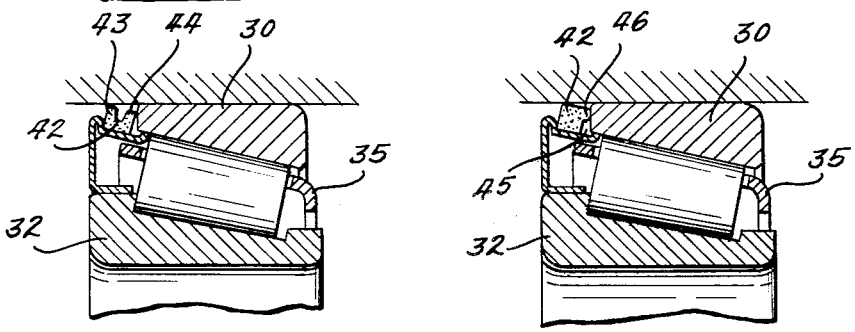
FIGS. 6 to 8 are detail sections showing modifications of the bearing of FIG. 5.

In the modification shown in FIG. 6, the inner end face of the ring or pad 42 is undercut as at 45 to provide a more resilient nose or projection 46 for engagement with the end face of the outer ring 30.

In the modification shown in FIG. 7, the ring or pad 42 is formed of channel shape so as to provide greater resilience for the edges 43 and 44 than is available in the pad of FIG. 5.

Figure 8:
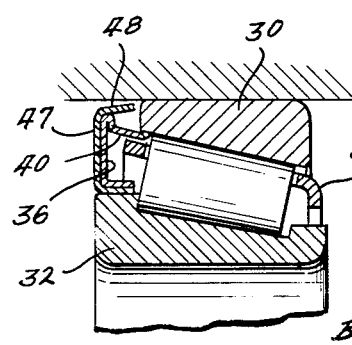

FIG. 8 shows an arrangement which incorporates a flinger 47 arranged as described in FIG. 1. In such case a resilient pad may be accommodated between the part 48 of the flinger 47 and the outer flange 40 of the closure member 36, the uppermost edge of the pad in this case engaging the flinger instead of the bore of the housing.

What is claimed is:

1. A roller bearing comprising relatively rotatable inner and outer race rings, large and small diameter ribs on said inner race ring defining a tapered race therebetween, said outer race ring having a tapered race thereon and an axially exposed face at one side of said tapered race opposite said large diameter rib on said inner race ring, tapered roller elements between said race rings and in said tapered races, and a device for closing the end of the bearing between said large diameter rib and said exposed face, said device including a closure member having an inner flange removably mounted on said large diameter rib, a body portion extending radially outwardly from said large diameter rib, an outer flange on said body portion directed angularly inwardly and axially toward said roller elements and terminating in a lip in close running clearance axially of said roller elements and radially of said exposed face on said tapered race in said outer race ring, and a seal ring secured on said outer flange by a flinger formed with an angularly flared outer margin overlying and angularly diverging from said outer flange on said closure member to provide a triangular space adjacent said exposed face on said outer race ring for said seal ring.

2. A roller bearing comprising an inner race ring having spaced larger and small diameter ribs defining a tapered race therebetween, an outer race ring having a tapered race thereon, tapered roller elements between said tapered races, and devices for closing the bearing at each end of said rolling bearing elements, one of said closing devices including a member having an inner marginal flange press-fitted upon said small diameter rib and an outer margin having a close running clearance with said outer race ring, and the other of said closing devices being mounted upon said large diameter rib and having a radial portion provided with an outer flange formed with an outermost rim portion in close running clearance with said outer race ring, said other device also having an innermost portion received on said large diameter rib and being angularly divergent relative to said outermost portion, and said outermost rim portion having a close running radial clearance with the tapered race on said outer race ring.

3. A roller bearing comprising relatively rotatable inner and outer race rings, rolling bearing elements disposed between said race rings, said inner ring having an annular rib at one end and said outer ring having an axially exposed face thereon at one end radially opposite said annular rib, and a closure device for closing the end of said bearing between said annular rib and exposed face, said device including a body of annular form and generally U-shaped in section, said body being formed with an inner annular flange carried on said annular rib so as to move therewith an an outer flange spaced from said inner annular flange and formed with a radially directed outer end folded back upon itself to form an annular flange-like bead from the root of which said outer flange extends toward the rolling elements, said outer flange also having a rim which is disposed in close clearance axially with the rolling bearing elements and radially inwardly of said exposed face, said closure device moving with said inner ring and having a running clearance relative to said outer race ring face and said rolling bearing elements.

4. A roller bearing as claimed in claim 1, including an annular resilient pad arranged around the outer flange and located by the bead with parts thereof in compressible engagement with the end face of the bearing outer ring and the bore of the housing of the bearing.

5. A roller bearing as claimed in claim 4, wherein the resilient pad is of rectangular section and one edge engages the said end face and another edge engages the said bore.

6. A roller bearing as claimed in claim 5, wherein the inner end face of the pad is undercut to provide a more resilient nose or projection for engagement with the said end face.

7. A roller bearing as claimed in claim 4, wherein the resilient pad is of channel shape and arranged with the outer edges of the channel sides in engagement respectively with the said end face and the said bore.

(References on following page)

References Cited by the Examiner

UNITED STATES PATENTS

| | | | |
|---|---|---|---|
| 2,010,499 | 8/1935 | Smith | 308—187.2 |
| 2,015,206 | 9/1935 | Tyson | 308—187.2 |
| 2,034,567 | 3/1936 | Fernstrom | 308—187.2 |
| 2,878,084 | 3/1959 | Bermingham | 308—187.1 |
| 2,916,313 | 12/1959 | Ziller et al. | 277—96 X |
| 3,006,701 | 10/1961 | Curtis | 308—187.1 |

FOREIGN PATENTS

| | | |
|---|---|---|
| 1,208,143 | 9/1959 | France. |
| 501,069 | 11/1954 | Italy. |
| 278,690 | 7/1949 | Switzerland. |

DAVID J. WILLIAMOWSKY, *Primary Examiner*.

FRANK SUSKO, *Examiner*.